Dec. 19, 1961  A. C. THOMAS  3,013,548
FOOD WARMER
Filed Nov. 16, 1959
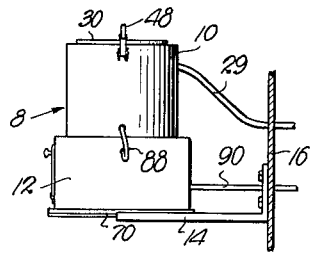
Fig. 1.
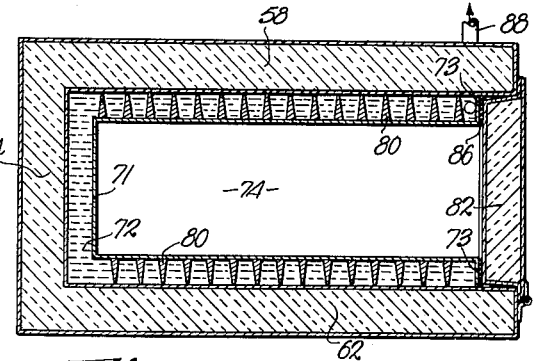
Fig. 4.
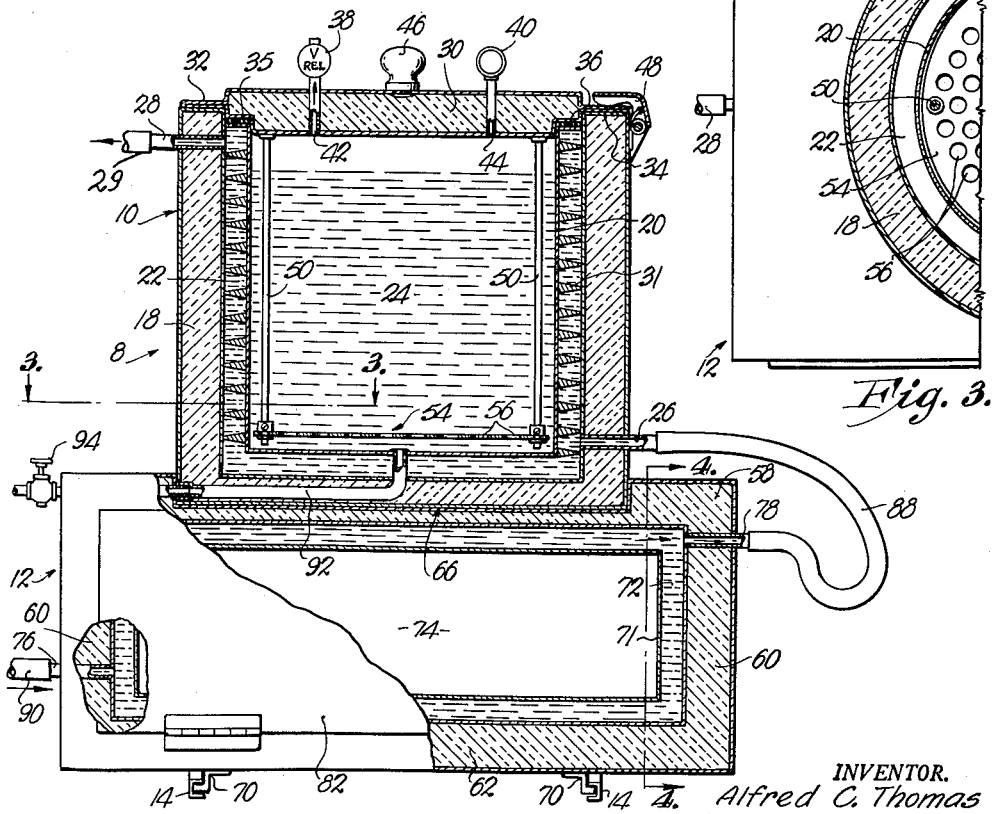
Fig. 2.
Fig. 3.
INVENTOR.
Alfred C. Thomas
BY
Hovey, Schmidt, Johnson & Hovey
ATTORNEYS.

United States Patent Office 3,013,548
Patented Dec. 19, 1961

3,013,548
FOOD WARMER
Alfred C. Thomas, 2418 Benton, Kansas City, Mo.
Filed Nov. 16, 1959, Ser. No. 853,257
2 Claims. (Cl. 126—19.5)

This invention relates to means for warming prepackaged foods and particularly to a food warmer adapted to be utilized in conjunction with the cooling system of an automobile whereby the heated fluid developed by said system may be used as a source of heat for warming such foods.

In view of the large variety of prepared foods presently available, and the relatively short time required to prepare such foods for consumption, a means of warming these foods by means of a food warmer which is capable of being carried by an automobile is desirable. Such a food warmer may be utilized during the course of a long trip or at a time when it is impractical or impossible to stop at a restaurant or the like.

It is, therefore, the primary object of this invention to provide a food warmer which may be utilized in conjunction with the cooling system of an automobile and carried in any part of the automobile, either in the passenger section, in the trunk or under the hood. The provision of such a food warmer will result in a considerable saving of money spent for meals in that prepared foods can be purchased at a cost below restaurant prices, heated in the food warmer carried by the automobile and consumed during a journey or during a time when the automobile is stopped for fuel or during a rest period.

A yet further object of this invention is to provide a food warmer which may be utilized as a source of hot water which may be used in bathing or shaving where access to such facilities is otherwise impracticable.

A yet further aim of the instant invention is to provide a food warmer for use in conjunction with the cooling system of an automobile whereby the fluid in said system which becomes heated during the operation of the automobile may be continuously circulated through the food warmer and heat imparted to food package receiving areas.

It is a further object of this invention to provide a food warmer having a first and a second vessel, said vessels having watertight chambers therein in surrounding relationship to the warming areas, there being means for circulating the preheated cooling system fluid through said chambers in a manner to extract the maximum heat from said fluid and transfer the same to the warming areas and the contents thereof.

Other objects of this invention include important details of construction which will become apparent from the following specification and accompanying drawing wherein:

FIG. 1 is a side elevational view of the food warmer showing the same mounted in position within an automobile;

FIG. 2 is a vertical sectional view of the food warmer;

FIG. 3 is a sectional view taken along line 3—3 of FIG. 2; and

FIG. 4 is a sectional view taken on line 4—4 of FIG. 2.

Referring to FIGS. 1 and 2, food warmer 8 broadly comprises a first cylindrical vessel 10 supported by a rectangular second vessel 12, the entire warmer 8 being supported on suitable brackets such as 14, which brackets 14 are rigidly attached to an upright bulkhead 16 such as the fire wall of an automobile as shown in FIG. 1.

Vessel 10 is comprised of an insulated annular outermost wall 18 and an innermost annular wall 20 which walls 18 and 20 form therebetween an annular, watertight chamber 22. Chamber 22 circumscribes a warming area 24 which may be filled with water to be heated, such water being supplied by a reserve tank which may also be carried by the automobile or by other suitable independent means. The water carried within warming area 24 may be used to either heat canned goods which are placed within area 24 or, as hereinafter explained, may be utilized to supply hot water for making drinks.

Chamber 22 is provided with a fluid inlet 26 which extends through wall 18 into said chamber 22, the opposite end thereof projecting outwardly from vessel 10. Fluid from the cooling system of an automobile may be directed into inlet 26 directly from said cooling system when it is desired to utilize vessel 10 independently of vessel 12. An outlet 28 is provided in the uppermost portion of vessel 10 and communicates at one end with chamber 22, the opposite end projecting outwardly from vessel 10. As is apparent from FIG. 2, cooling system fluid may be introduced through inlet 26, which fluid will pass through chamber 22 and out of said chamber for return to the cooling system of the automobile through a suitable connection such as 29.

A continuous vane 31 is disposed within chamber 22, said vane 31 being triangular in cross section and having its base portion secured to the outer surface of innermost wall 20. As is apparent from the drawing, vane 31 is spirally wrapped about wall 20 and the apex portion thereof is in contact with the inner surface of wall 18 whereby a continuous spiral pathway is formed to guide the cooling system fluid from inlet 26 to outlet 28. As the cooling system fluid passes through chamber 22 and is guided by vane 31 through a spiral pathway, a maximum amount of heat is extracted therefrom and imparted to the contents of warming area 24, raising the temperature of said contents or, in the case of the contents being water, heating the same to furnish hot water either for drinking or heating purposes.

Vessel 10 is closed at the top by means of a removable, circular insulated lid 30, the peripheral edge 32 thereof conforming in shape to the upper edge 34 of outer wall 18 to provide a seal and prevent any loss of heat from warming area 24. To create an additional seal, a gasket 36 is seated on the upper rim 35 of chamber 22, said rim being formed by an outwardly turned portion of inner wall 20 which is joined with the inner surface of wall 18. A pressure relief valve 38 and a temperature gage 40 are mounted on lid 30 and communicate with warming area 24 by means of interconnectives 42 and 44 respectively. A handle 46 is provided on lid 30 for placement and removal thereof, said lid 30 being firmly held on vessel 10 by means of releasable clamps such as 48.

A pair of rods 50 are attached at one end thereof to the under side of lid 30 and support, at the opposite ends thereof, a circular platform 54, said platform being provided with a plurality of perforations 56. Platform 54 is adjustable on rods 50 and may be disposed at any level within warming area 24 to accommodate objects which are placed within area 24 for warming. Removal of lid 30 from vessel 10 also serves to lift platform 54 from within area 24 whereby access may be had to articles carried by said platform.

Second vessel 12 is preferably rectangular in configuration and has an outermost top wall 58, outermost side walls 60, outermost bottom wall 62 and outermost rear wall 64, said walls being suitably insulated. An indentation 66 is formed in top wall 58 and receives the lowermost portion of vessel 10, the diameter of indentation 66 being substantially the same as the outermost diameter of vessel 10 whereby the latter will fit tightly within said indentation 66 and movement of vessel 10 with respect to vessel 12 thus prevented. Bottom wall 62 carries bracket members 70 which engage the aforementioned members 14 to slidably support food warmer 8 with respect to said members 14. An innermost wall 71 cooperates with outermost walls 58, 60, 62 and 64 to form therebetween a watertight compartment 72, said innermost wall 71 having a downturned portion 73 secured to the innermost surface of said outer walls 58, 60 and 62 to seal said watertight compartment 72. Compartment 72 substantially surrounds a food receiving space 74 which may be used as an oven for the heating of foods. Compartment 72 is provided with a fluid inlet 76 extending through one of end walls 60 and in connection with compartment 72 and a fluid outlet 78 which is in communication with compartment 72 at the opposite end thereof. A continuous, triangular vane 80 is disposed within compartment 72 and spirally wrapped about inner wall 71, the base edge of said vane 80 being secured to the outermost surface of wall 71 and the apex edge thereof being in engagement with the inner surface of outermost walls 58, 60 and 62. As is apparent, preheated cooling system fluid may enter compartment 72 through inlet 76 and the same will be directed in a helical path therethrough by means of vane 80 after which it will pass out of said compartment 72 through outlet 78. The end of vessel 12 opposite wall 64 is provided with an opening which is closed by an insulated door 82 hingedly mounted on the longitudinal face of bottom wall 62, which door 82 may be opened to gain access to food receiving space 74. A gasket 86 is disposed along the edge 73 of inner wall 71 and provides a seal for door 82 when the same is closed to retain the maximum amount of heat within space 74.

A flexible tube such as 88 interconnects outlet 78 of compartment 72 with inlet 26 of chamber 22 allowing preheated cooling system fluid which has been introduced into compartment 72 to pass therefrom into chamber 22. As is best shown in FIG. 2, the two vessels may be interconnected by tube 88 whereby food receiving space 74 and warming area 24 may be continuously heated by means of the preheated cooling system fluid passing through compartment 72 and chamber 22, said fluid being initially introduced into compartment 72 by means of a connecting tube 90 which is suitably coupled with an outlet of the cooling system of the automobile. When so introduced into compartment 72 through inlet 76, the heated fluid passes through compartment 72 along the path formed by vane 80, leaves the compartment at outlet 78 and passes through tube 88 into chamber 22 by means of inlet 26. After passing through chamber 22, over the path formed by vane 31, the fluid passes out of chamber 22 through outlet 28 and is returned to the cooling system by tube 29. Suitable valving may be disposed within tube 90 to control the passage of fluid into the continuous circuit above-described and it will be appreciated that when said valve is opened a continuous flow of cooling system fluid through the food warmer 8 is permitted whereby the preheated cooling system fluid imparts heat to food receiving space 74 and warming area 24 because of the heat exchanging nature of the construction of vessels 10 and 12.

Water heated within area 24 may be removed therefrom for drinking or washing purposes by means of a tube 92, one end of which communicates with area 24 through the bottom thereof, the other end extending outwardly from one side wall of vessel 12. As is apparent from FIG. 2, tube 92 is carried within the confines of outer wall 18 of vessel 10 and passes therefrom into the confines of top wall 58 of vessel 12 adjacent indentation 66 and then projects outwardly from said outermost wall of vessel 12. A valve such as 94 may be interposed within tube 92 to control the outward flow of water from within area 24. Thus water heated within area 24 is readily available to be used in making hot drinks or for washing or shaving by the occupants of the automobile within which a warmer such as 8 is carried.

Having thus described the invention what is claimed as new and desired to be secured by Letters Patent is:

1. A food warmer adapted for use in conjunction with the cooling system of an automobile comprising a first, open top vessel including an innermost wall and an outermost wall spaced from said innermost wall to form a water-tight chamber between said walls, said chamber surrounding a warming area adapted to receive fluids to be heated and one of the walls of said first vessel being provided with a pair of vertically spaced openings therein providing an inlet and an outlet for said chamber; a second vessel including an innermost wall and an outermost wall spaced from said innermost wall to form a watertight compartment between said walls, said compartment surrounding a warming space adapted to receive solid foods to be heated and one of the walls of said second vessel being provided with a pair of vertically spaced openings therein providing a fluid inlet and a fluid outlet for said compartment, said walls having an aperture therethrough providing an access to said space; removable closure means on each of said vessels for closing said top and said aperture, respectively; means on said second vessel for supporting said first vessel thereon and to prevent lateral movement of the first vessel relative thereto; conduit means on said vessels for interconnecting one of the openings of said compartment with one of said openings of said chamber to permit the flow of fluid between the latter and said compartment, the other openings of said chamber and said compartment adapted to be placed in fluid communication with said cooling system; and guide structure within said chamber and said compartment for directing cooling system fluid therethrough along substantially a spiral path around the area and space respectively between corresponding inlets and outlets thereof, said structure including an elongated, continuous vane secured at opposed ends thereof to corresponding walls proximal to the corresponding inlet and outlet respectively, and provided with a pair of opposed, longitudinal edges in engagement with the adjacent walls, whereby heat energy is imparted to said area and said space when said fluid flows in a spiral path through said chamber and said compartment, respectively.

2. A food warmer as set forth in claim 1, wherein each of said vanes is transversely triangular, said supporting means on said second vessel comprising a member integral with the top portion of said outermost wall thereof, said member having an indentation therein complementally seating the bottom portion of the outermost wall of said first vessel, and a food-carrying platform secured to the closure means of said first vessel and receivable within said area when said closure means closes the open top of said first vessel.

References Cited in the file of this patent

UNITED STATES PATENTS

| 96,518 | Waterman | Nov. 2, 1869 |
| 1,285,304 | Merrill | Nov. 19, 1918 |
| 2,319,422 | Maihack | May 18, 1943 |
| 2,693,793 | Steven | Nov. 9, 1954 |

FOREIGN PATENTS

| 850,790 | Germany | Sept. 29, 1952 |
| 250,603 | Great Britain | Apr. 21, 1927 |
| 351,148 | Italy | Aug. 4, 1937 |
| 474,594 | Italy | Sept. 26, 1952 |
| 78,264 | Sweden | Aug. 26, 1931 |